United States Patent
Clasen et al.

(10) Patent No.: US 11,534,281 B2
(45) Date of Patent: Dec. 27, 2022

(54) DENTAL SUCTION DEVICE WITH A CAMERA

(71) Applicant: Cleverdent Ltd., Münster (DE)

(72) Inventors: Stephan Clasen, Münster (DE); Martin Kayser, Cologne (DE)

(73) Assignee: Cleverdent Ltd., Münster (DE)

( * ) Notice: Subject to any disclaimer, the term of this patent is extended or adjusted under 35 U.S.C. 154(b) by 0 days.

(21) Appl. No.: 16/337,419

(22) PCT Filed: Sep. 26, 2017

(86) PCT No.: PCT/EP2017/074349
§ 371 (c)(1),
(2) Date: Mar. 28, 2019

(87) PCT Pub. No.: WO2018/060184
PCT Pub. Date: Apr. 5, 2018

(65) Prior Publication Data
US 2020/0030068 A1    Jan. 30, 2020

(30) Foreign Application Priority Data
Sep. 28, 2016   (DE) .................... 10 2016 118 323.7

(51) Int. Cl.
*A61C 17/08*    (2006.01)
*A61C 17/12*    (2006.01)
(52) U.S. Cl.
CPC ............. *A61C 17/08* (2019.05); *A61C 17/12* (2019.05)

(58) Field of Classification Search
CPC ......... A61C 17/08; A61C 17/12; A61C 17/18; A61C 17/084; A61C 17/088; A61C 1/088;
(Continued)

(56) References Cited

U.S. PATENT DOCUMENTS 5,528,432 A * 6/1996 Donahoo ............ G02B 23/2484
348/66
5,702,249 A * 12/1997 Cooper ................ H04N 5/2251
433/29
(Continued)

FOREIGN PATENT DOCUMENTS

CN       204207825 U  *  3/2015
WO   WO-2016107615 A1 *  7/2016   ............... A61B 1/05

OTHER PUBLICATIONS

Internationaler Recherchenbericht und der Schriftliche Bescheid [International Search Report and the Written Opinion] dated Jan. 22, 2018 From the International Searching Authority Re. Application No. PCT/EP2017/074349 and Its Translation of Search Report Into English. (13 Pages).
(Continued)

*Primary Examiner* — Edward Moran
*Assistant Examiner* — Matthew P Saunders

(57) ABSTRACT

The invention relates to a dental suction device (10) for suctioning liquids and particles from an oral cavity of a patient, with a tubular hollow base body (12) having an inner surface (14), an outer surface (16), a longitudinal axis (X-X), a connection opening (18) for a hose, and a suction opening (20). In the course of the extent of the base body (12), an objective (50) is provided, which can be connected to a monitor (40), and by means of which the image taken by the objective (50) can be displayed.

8 Claims, 1 Drawing Sheet

(58) Field of Classification Search
CPC ....... A61C 9/0053; A61C 3/0008; A61B 1/07; A61B 1/24; A61B 1/247; A61B 1/0676; A61B 2090/306; A61B 1/015; A61B 5/0088; A61B 1/253
USPC .............................................. 433/29–31, 91
See application file for complete search history.

(56) References Cited

U.S. PATENT DOCUMENTS

| | | | |
|---|---|---|---|
| 5,931,670 | A | 8/1999 | Davis |
| 6,069,651 | A * | 5/2000 | Tsuyuki ............. G02B 23/2423 348/75 |
| 6,270,342 | B1 * | 8/2001 | Neuberger ........... A61C 1/0046 433/132 |
| 9,629,533 | B2 * | 4/2017 | Watson ............. A61B 1/00128 |
| 10,206,564 | B2 * | 2/2019 | Watson ............. A61B 1/00133 |
| 2004/0114034 | A1 * | 6/2004 | Squilla ................. A61B 1/042 348/66 |
| 2005/0084816 | A1 * | 4/2005 | Mehdizadeh ........... A61B 1/24 433/29 |
| 2007/0239149 | A1 * | 10/2007 | Lieponis ............... A61M 1/008 606/15 |
| 2008/0160477 | A1 * | 7/2008 | Stookey ............... A61B 5/0088 433/31 |
| 2009/0221991 | A1 | 9/2009 | Lieponis |
| 2009/0227998 | A1 * | 9/2009 | Aljuri .................. A61C 1/0046 606/13 |
| 2010/0190129 | A1 * | 7/2010 | Paz ........................ A61C 1/088 433/29 |
| 2014/0272764 | A1 * | 9/2014 | Miller ................ A61B 1/00016 433/27 |
| 2015/0164310 | A1 * | 6/2015 | Holt .................. A61M 16/0447 600/199 |
| 2016/0259515 | A1 * | 9/2016 | Sabina ................ G06F 3/04883 |
| 2018/0049950 | A1 * | 2/2018 | Besser ................ A61J 15/0076 |
| 2020/0367732 | A1 * | 11/2020 | Yamaya ................... A61B 1/05 |

OTHER PUBLICATIONS

Translation of Reason for Rejection dated Dec. 1, 2020 From the Japanese Patent Office Re. Application No. 2019-537,878. ( 4 Pages).

* cited by examiner

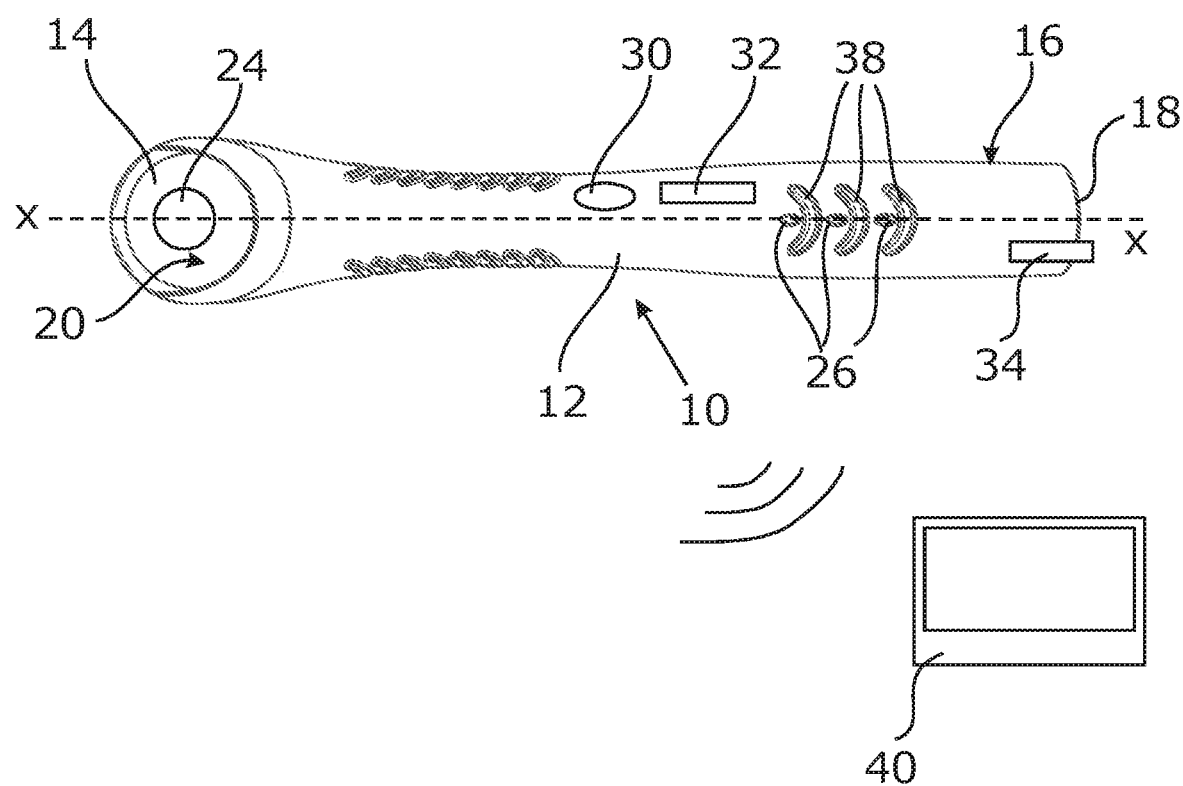

DENTAL SUCTION DEVICE WITH A CAMERA

RELATED APPLICATIONS

This application is a National Phase of PCT Patent Application No. PCT/EP2017/074349 having International filing date of Sep. 26, 2017, which claims the benefit of priority of German Patent Application No. 10 2016 118 323.7 filed on Sep. 28, 2016. The contents of the above applications are all incorporated by reference as if fully set forth herein in their entirety.

FIELD AND BACKGROUND OF THE INVENTION

The present invention relates to a dental suction device for suctioning liquids and particles from an oral cavity of a patient, with a hollow base body having an outer surface, an inner surface, a longitudinal axis, a connection opening, and a suction opening.

Dental treatments often require that emerging liquids or dissolved particles, such as saliva, spray water and blood, be suctioned off during treatment. Also, water, for example for cleaning or after using a multi-function syringe, may accrue, which has to be suctioned off. Usually, suction devices are used for this purpose, which are generally formed from a tubular body of plastic, to whose end a hose is attached, which in turn is connected to a pump. The distracting liquids and solids are carried away through the hose.

A suction device is often not guided and held by the attending dentist or dental surgeon himself but by an assistant, because the attending dentist has to hold a drilling tool with the one hand and a mirror with the other, with which he is able to inspect the area to be treated. The above-described procedure is disadvantageous in that the two people have to stand or sit very close to each other, around the area to be treated. Particularly if the interventions are rather difficult or demanding with regard to fine-motor skills, this may be perceived as distracting by the attending physician.

A medical suction device in which the inner surface has a mirror-coated surface which is visible through the suction opening is known from DE 102006048463 A1. The reflective coating according to the invention enables the user to use the medical suction device both as a suction device for removing liquids and particles and, simultaneously, as a mirror. Using such a suction device, it is now possible for him to carry out the treatment without an assisting person. Thus, the suction device is simultaneously used as a suction device and as a mirror. The basic concept of the combination is very good in principle, but limited in its possibilities.

SUMMARY OF THE INVENTION

The object of the present invention is to provide a suction device which is improved over the known mirror suction device. The former is supposed also to offer the possibility of inspecting the oral cavity during suctioning. In particular, the suction device is supposed to facilitate the documentation of conditions in the oral cavity or of work progress. At the same time, the suction device is supposed to be cost-effective to produce and easy to operate.

According to the invention, the object is achieved with a suction device having the features of claim 1.

Accordingly, the suction device, in the course of the extent of the base body, has an objective, which can be connected to a monitor, by means of which the image taken by the objective can be displayed.

It is thus possible to inspect the area to be treated in the oral cavity during the treatment, on the one hand directly, and on the other hand indirectly via the monitor.

Furthermore, a processor or computer is advantageously provided, by means of which images or film sequences or videos taken by the objective can be stored in a data storage. This enables the treatment process to be documented and may, in particular, also serve for the information of the patient.

According to the invention, it is also possible to record image frames or videos by means of an operation button also provided on the suction device and to forward them to the processor for storage. During the treatment, and without having to interrupt it, the therapist is thus able to decide whether he wishes to only transmit the image taken by the objective onto the monitor or whether he wishes to record and store it.

Furthermore, the objective may have a device for enlarging or scaling down the recorded image (zooming function or zooming device). In a particularly advantageous variant, an operating means for control is provided on the side of the suction device, preferably a slide control or a wheel, which is connected to the objective and can be operated with only one finger during the treatment.

In a preferred variant of an embodiment, the suction device thus comprises the operating means for the zooming device and, in addition, a button, in particular a push button, for starting or ending video footage to be recorded or for taking photographs.

The objective may itself form a region of the inner surface of the suction device, e.g. the lens, but may also be disposed in a sealed depression within the base body. If such a depression is provided, it is sealed by a transparent pane through which the objective is able to film. For hygienic reasons, the depression is advantageously completely sealed, so that no liquids from the oral cavity or the environment are able to penetrate it.

In the region of the connection opening, the suction device may comprise means for electrical connection. These cooperate with corresponding means provided at a hose end of the hose. Thus, the suction device according to the invention can be plugged onto the hose and at the same time be electrically connected, preferably via a plug-and-socket connection.

The connection to the monitor may be carried out wirelessly or using wires. If it is carried out using wires, corresponding means are also advantageously provided in the region of the hose end. A plug-and-socket connection is also suitable for this purpose.

BRIEF DESCRIPTION OF THE SEVERAL VIEWS OF THE DRAWINGS

The invention is explained in more detail with reference to the following FIGURE. It shows only one exemplary embodiment; the invention is not supposed to be limited thereto.

DESCRIPTION OF SPECIFIC EMBODIMENTS OF THE INVENTION

As is apparent from the FIGURE, a suction device 10 according to the invention has a hollow, tubular base body 12 with an inner surface 14 and an outer surface 16. Moreover, the base body 12 has a longitudinal axis X-X.

The base body 12 has a connection opening 18 for a hose, which is not shown, and a suction opening 20 for suctioning particles and liquids. The liquids or particles to be suctioned off are sucked through the connection opening 20 and carried away through the connection opening 18 via the hose.

According to the invention, an objective 24 is disposed within the base body 12 in the region of the suction opening 20 and directed in the direction towards the oral cavity, so that the latter is visible through the objective 24. In the exemplary embodiment shown, the objective 24 is disposed in its entirety within the base body 12, i.e. behind the suction opening 20 as viewed in the flowing direction of the air to be suctioned off. The suctioned air is guided over a lens of the objective 24, which is not recognizable, or a cover of a depression or cavity in which the objective 24 is located, which effectively prevents fogging.

The suction device 10 has additional openings 26 through which air is also suctioned. The additional openings 26 prevent a negative pressure within the base body 12 if the suction opening 20 is sealed by, for example, the tongue or cheek of the patient. Three additional openings 26 are provided in the exemplary embodiment, however, only a single additional opening 26 or even more than three additional openings 26 are also conceivable.

Profile members 38, which provide for a safe grip of the suction device 10 and prevent the fingers of the attending dentist from slipping, are discernible on the outer surface 16 of the base body 12.

A button 30, which is configured as a push button, is also shown, which can be operated with just one finger and, in particular, serves for starting or ending video footage to be recorded or for taking photographs.

Preferably, the objective includes a device for enlarging or scaling down the image taken by means of the objective 24 (zooming function or zooming device). The device may operate or be configured in an analog or digital manner. In a particularly advantageous variant, a slide control 32, which can also be operated with only one finger, is provided on the side of the suction device 10.

Finally, a means 34 which serves for electrically connecting the suction device 10 to an electrical source is shown merely schematically. For this purpose, an appropriate corresponding means is provided on the hose, which is not shown.

In the exemplary embodiment, the objective 24 is connected to a monitor 40, which is also illustrated only symbolically, in a wireless manner, which is illustrated by the line symbol. Wi-Fi or Bluetooth, for example, are suitable for the wireless connection.

The invention is not limited to the exemplary embodiments described, but also includes all embodiments acting in an equivalent way. The above-described variant of an embodiment is to be understood only as an example, and not as limiting. It is also possible to combine the technical features shown in any technically meaningful manner.

What is claimed is:

1. A handheld dental suction device (10) formed as a single tubular hollow base body (12), having an inner surface (14), an outer surface (16), a longitudinal axis (X-X), and a connection opening (18) for a hose, the tubular hollow base body 12) comprising:
    an objective lens (24) in the course of an extent of the base body (12), operable to take an image or a video, comprising;
    a connection to a monitor (40), wherein the monitor displays the image taken by the objective;
    and a zoom controller comprising a slide control of the objective lens to perform a zooming function on an image taken by the objective lens;
    wherein the slide control is operable during treatment using a single finger of a user;
    wherein the objective lens (24) is mounted in an inner surface of the suction device (10) below a suction opening (20) which is used for suctioning liquids and particles from an oral cavity of a patient and along the longitudinal axis (X-X);
    wherein a flowing direction of air to be suctioned off through the tubular hollow base body (12) is parallel to the longitudinal axis (X-X) and over the objective lens (24) in the tubular hollow base body (12);
    wherein the objective lens (24) is disposed in an interior of the tubular hollow base body (12) in relation to a z-axis -behind and below the suction opening (20) of the tubular base body (12) as viewed in a flowing direction of the air to be suctioned off in such a way that the suctioned air is guided into and through the tubular hollow base body (12) over the objective lens (24) which effectively prevents fogging.

2. The handheld dental suction device (10) according to claim 1, wherein the objective lens (24) is disposed in a region of the suction opening (20).

3. The handheld dental suction device of claim 1, further comprising a controller of the objective lens (24) comprised of a push button located on a side of the dental suction device, wherein the push button is operable during treatment to do at least one of the following:
    i) start and end recording of the video; or
    ii) take the image.

4. The handheld dental suction device of claim 1, further comprising a processor and a connection to a data storage wherein the processor is operable to store the images, the video or any combination thereof to a memory storage.

5. The handheld dental suction device of claim 1, wherein the objective lens (24) is disposed in a depression within the tubular hollow base body.

6. The handheld dental suction device of claim 5, wherein the depression is sealed at least against liquids from the oral cavity.

7. The handheld dental suction device of claim 6, wherein the sealed depression is sealed by a transparent pane.

8. The handheld dental suction device of claim 6, wherein the connection opening and the objective lens (24) are mounted along the longitudinal axis (X-X), at opposite ends of the tubular hollow base body (12).

* * * * *